US008889783B2

(12) United States Patent
Hayes

(10) Patent No.: US 8,889,783 B2
(45) Date of Patent: Nov. 18, 2014

(54) COPOLYMERS INCLUDING BIOBASED MONOMERS AND METHODS OF MAKING AND USING SAME

(71) Applicant: BASF SE, Ludwigshafen (DE)

(72) Inventor: Peter C. Hayes, Charlotte, NC (US)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/088,313

(22) Filed: Nov. 22, 2013

(65) Prior Publication Data

US 2014/0080967 A1 Mar. 20, 2014

Related U.S. Application Data

(62) Division of application No. 13/085,933, filed on Apr. 13, 2011, now Pat. No. 8,642,696.

(60) Provisional application No. 61/333,833, filed on May 12, 2010.

(51) Int. Cl.
| | |
|---|---|
| *C08F 220/10* | (2006.01) |
| *C09D 147/00* | (2006.01) |
| *C09D 125/14* | (2006.01) |
| *C09J 147/00* | (2006.01) |

(52) U.S. Cl.
CPC ............. *C09J 147/00* (2013.01); *C08F 220/10* (2013.01); *C09D 147/00* (2013.01); *C09D 125/14* (2013.01)
USPC .......................... 524/553; 526/319; 526/326.1

(58) Field of Classification Search
CPC .. C08F 220/10; C09D 147/00; C09D 125/14; C09J 147/00
USPC ................................. 524/553; 526/319, 326.1
See application file for complete search history.

(56) References Cited

U.S. PATENT DOCUMENTS

| | | | |
|---|---|---|---|
| 3,738,991 | A | 6/1973 | Reed |
| 5,679,738 | A | 10/1997 | Bafford et al. |
| 6,293,037 | B1 | 9/2001 | Spada et al. |
| 6,573,305 | B1 | 6/2003 | Thunhorst et al. |
| 6,645,478 | B2 | 11/2003 | Rollat et al. |
| 6,667,378 | B2 | 12/2003 | Rollat et al. |
| 6,689,346 | B1 * | 2/2004 | Rollat et al. .............. 424/70.1 |
| 6,750,261 | B1 | 6/2004 | Clear et al. |
| 7,138,436 | B2 | 11/2006 | Tan et al. |
| 2010/0167614 | A1 | 7/2010 | Lu et al. |

FOREIGN PATENT DOCUMENTS

| | | |
|---|---|---|
| EP | 960893 | 12/1999 |
| EP | 1201223 | 5/2002 |
| WO | 9824825 | 6/1998 |
| WO | 0121693 | 3/2001 |
| WO | 02100930 | 12/2002 |
| WO | 03000210 | 1/2003 |
| WO | 03000211 | 1/2003 |
| WO | 2005041987 | 5/2005 |
| WO | 2010075387 | 7/2010 |

OTHER PUBLICATIONS

ASTM D6866-08, "Standard Test Methods for Determining the Biobased Content of Solid, Liquid, and Gaseous Samples Using Radiocarbon Analysis," Sep. 2008.

Back et al., "Emulsion and miniemulsion polymerization of isobornyl acrylate," Journal of Applied Polymer Science, 103(2): 819-833 (2007).

Chai et al., "Measurement of the Solubilities of Vinylic Monomers in Water," Industrial & Engineering Chemistry Research, 44(14): 5256-5258 (2005).

Dong et al, "Preparation of xPEA/xP (isobornyl acrylate) mosaic latex interpenetrating polymer networks," Hecheng Xiangjiao Gongye, 26(3): 169 (2003).

Kampes et al., "Emulsifier-free emulsion polymerization of the comonomer system styrene/tetrahydrofurfuryl methacrylate," Colloid & Polymer Science, 275(12): 1136-1143 (1997).

\* cited by examiner

*Primary Examiner* — Michael M Bernshteyn
(74) *Attorney, Agent, or Firm* — Meunier Carlin & Curfman, LLC

(57) ABSTRACT

Copolymer compositions and methods for making these compositions are described. The copolymers include a vinyl aromatic monomer; a second monomer, and a biobased monomer. The second monomer is selected from the group consisting of butadiene, alkyl acrylates, alkyl methacrylates, and mixtures thereof. Examples of biobased monomers useful in the compositions include isobornyl acrylate, isobornyl methacrylate, tetrahydrofurfuryl acrylate, tetrahydrofurfuryl methacrylate, lauryl acrylate, lauryl methacrylate, and mixtures thereof. The compositions described herein can be used for binder or coating compositions and can include coating pigments, mineral fillers, and other additives.

15 Claims, No Drawings

US 8,889,783 B2

COPOLYMERS INCLUDING BIOBASED MONOMERS AND METHODS OF MAKING AND USING SAME

CROSS-REFERENCE TO RELATED APPLICATIONS

This application is a divisional application of U.S. patent application Ser. No. 13/085,933 filed Apr. 13, 2011, which claims priority to U.S. Provisional Application No. 61/333,833, filed May 12, 2010, both of which are incorporated herein by reference in their entirety.

BACKGROUND

Copolymer compositions used for such purposes as binders or coatings, e.g., carpet backing and adhesives, are often made using monomers derived from oil based sources, i.e., fossil fuels. An example of such a copolymer composition using monomers derived from an oil based source includes currently available styrene-butadiene copolymers. However, the movement toward environmental sustainability has provided an impetus for the development of copolymers utilizing as much raw material fitting within a sustainable framework as possible. For example, the LEED Green Building Rating System™ requires that materials incorporate 5% of rapidly renewable materials. Providing binders or coatings that can be utilized in building materials to help meet the requirements of the LEED Green Building Rating System™ would be beneficial to the environment. However, it is also important that the binders or coatings maintain the properties that make them beneficial for their particular use.

SUMMARY

Compositions are described herein that include a copolymer derived from a vinyl aromatic monomer, a second monomer, and a biobased monomer. The second monomer is selected from the group consisting of butadiene, alkyl acrylates, alkyl methacrylates, and mixtures thereof. In some embodiments, the biobased monomer can include isobornyl acrylate, isobornyl methacrylate, tetrahydrofurfuryl acrylate, tetrahydrofurfuryl methacrylate, or mixtures thereof. In some embodiments, the biobased monomer can include lauryl acrylate, lauryl methacrylate, or mixtures thereof. The median particle size of the copolymer can be 200 nm or less. In some embodiments, the vinyl aromatic monomer can be present in an amount of greater than 20 weight percent based on the total (meth)acrylate content. In some embodiments, the copolymer has a biobased carbon content of 10 or greater weight percent. The compositions can further include a coating pigment and/or a mineral filler and can be used in binding and coating compositions (e.g., in carpet backing).

Also described are processes for preparing a copolymer that include copolymerizing a vinyl aromatic monomers, a second monomer, and a biobased monomer. The second monomer is selected from the group consisting of butadiene, alkyl acrylates, alkyl methacrylates, and mixtures thereof. In some embodiments, the biobased monomer can include isobornyl acrylate, isobornyl methacrylate, tetrahydrofurfuryl acrylate, tetrahydrofurfuryl methacrylate, and mixtures thereof. In some embodiments, the copolymer has a biobased carbon content of 10 or greater weight percent.

DETAILED DESCRIPTION

Copolymer compositions and methods for making these compositions are disclosed. The compositions include one or more vinyl aromatic monomers; a second monomer, and a biobased monomer. The second monomer comprises butadiene, alkyl acrylates, alkyl methacrylates, or mixtures thereof. The biobased monomer comprises monomers containing biobased carbon. Examples of such biobased monomers include isobornyl acrylate, isobornyl methacrylate, tetrahydrofurfuryl acrylate, tetrahydrofurfuryl methacrylate, itaconic acid, lauryl acrylate, lauryl methacrylate, or mixtures thereof. The compositions described herein can be used for binder or coating compositions and can include fillers, pigments, and other additives known to those of skill in the art.

Vinyl aromatic monomers useful with the compositions described herein include, but are not limited to, styrene, α-methylstyrene, o-chlorostyrene, vinyltoluenes, and mixtures thereof. In some embodiments, the vinyl aromatic monomer includes styrene. The copolymer can be derived from 5 or greater weight percent, 10 or greater weight percent, 15 or greater weight percent, 20 or greater weight percent, 25 or greater weight percent, 30 or greater weight percent, 35 or greater weight percent, 40 or greater weight percent, 45 or greater weight percent, 50 or greater weight percent, 55 or greater weight percent, 60 or greater weight percent, 70 or greater weight percent, 75 or greater weight percent, or 80 or greater weight percent of one or more vinyl aromatic monomers based on the total (meth)acrylate content. In some examples, the amount of vinyl aromatic monomer is greater than 20 weight percent based on the total (meth)acrylate content. The total (meth)acrylate content includes the combined weight of alkyl acrylates and alkyl methacrylates including biobased alkyl acrylates and methacrylates. In some examples, the copolymer can be derived from 5 or greater weight percent, 10 or greater weight percent, 15 or greater weight percent, 20 or greater weight percent, 25 or greater weight percent, 30 or greater weight percent, 35 or greater weight percent, 40 or greater weight percent, 45 or greater weight percent, 50 or greater weight percent, 55 or greater weight percent, 60 or greater weight percent, 70 or greater weight percent, 75 or greater weight percent, or 80 or greater weight percent of one or more vinyl aromatic monomers based on the total monomer content.

Butadienes useful with the compositions described herein include, but are not limited to, 1,2-butadiene, 1,3-butadiene, and mixtures thereof. In some embodiments, the butadiene includes 1,3-butadiene. In some examples, the copolymer can be derived from 0 to 45 weight percent butadiene. For example, the copolymer can be derived from 45 weight percent or lower, 35 weight percent or lower, 25 weight percent or lower, 20 weight percent or lower, 15 weight percent or lower, 10 weight percent or lower, or 5 weight percent or lower of butadiene. In some examples, the copolymer can be derived from greater than 0 weight percent, 5 weight percent or greater, 10 weight percent or greater, 15 weight percent or greater, 20 weight percent or greater, 25 weight percent or greater, or 30 weight percent or greater of butadiene.

Alkyl acrylates and alkyl methacrylates useful with the compositions described herein include, but are not limited to, esters of $C_3$-$C_6$ α,β-monoethylenically unsaturated mono- and dicarboxylic acids (e.g., esters of acrylic acid, methacrylic acid, maleic acid, fumaric acid, or itaconic acid), and $C_1$-$C_{14}$ alkanols. Examples of useful alkyl acrylate esters and methacrylate esters include, but are not limited to, methyl acrylate, methyl methacrylate, ethyl acrylate, ethyl methacrylate, n-propyl acrylate, n-propyl methacrylate, isopropyl acrylate, isopropyl methacrylate, butyl acrylate (n-butyl acrylate, isobutyl acrylate, sec-butyl acrylate, t-butyl acrylate), butyl methacrylate (n-butyl methacrylate, isobutyl methacrylate, sec-butyl methacrylate, t-butyl methacrylate), hexyl acrylate, hexyl methacrylate, cyclohexyl acrylate, cyclohexyl methacrylate, n-octyl acrylate, n-octyl methacrylate, isooctyl acrylate, isooctyl methacrylate, 2-ethylhexyl acrylate, 2-ethylhexyl methacrylate, isononyl acrylate, isononyl methacrylate, lauryl acrylate, lauryl methacrylate, and mixtures thereof. In some embodiments, the alkyl acrylate or methacrylate can include methyl methacrylate, ethyl acrylate, butyl acrylate, 2-ethylhexyl acrylate, or mixtures thereof. The copolymer can be derived from 5 to 55 weight percent of alkyl acrylates or methacrylates. For example, the copolymer can be derived from 5 weight percent or greater, 10 weight percent or greater, 15 weight percent or greater, 20 weight percent or greater, 25 weight percent or greater, 30 weight percent or greater, 35 weight percent or greater, 40 weight percent or greater, or can be derived from 55 weight percent or lower, 45 weight percent or lower, 35 weight percent or lower, 25 weight percent or lower, 20 weight percent or lower, 15 weight percent or lower, or 10 weight percent or lower of alkyl acrylates or methacrylates.

Biobased monomers useful with the compositions described herein include monomers containing biobased carbon. Biobased monomers useful with the compositions described herein include monomers containing 25 weight percent or greater, 30 weight percent or greater, 35 weight percent or greater, 40 weight percent or greater, 45 weight percent or greater, 50 weight percent or greater, 55 weight percent or greater, 60 weight percent or greater, 65 weight percent or greater, 70 weight percent or greater, 75 weight percent or greater, 80 weight percent or greater, 85 weight percent or greater, 90 weight percent or greater, or 95 weight percent or greater biobased carbon (based on the total carbon content).

As used herein the term biobased carbon is intended to mean carbon obtained from a biological source rather than a fossil oil based source. The biobased content of a monomer, a copolymer, or a copolymer composition can be determined using a method such as ASTM D6866-08. ASTM D6866-08 provides three different methods for determining the biobased content of a solid, liquid, or gaseous composition. For example, the compositions described herein can be dried as a film and tested as a solid. As defined by ASTM D6866-08, biobased content is the amount of biobased carbon in the material or product as a percent of the weight (mass) of the total organic carbon in the product. In particular, ASTM D6866-08 Method B measures the ratios of $^{14}C/^{12}C$ and $^{13}C/^{12}C$ in the composition using Accelerator Mass Spectrometry (AMS) and Isotope Ratio Mass Spectrometry (IRMS). Fossil based carbon contains essentially no $^{14}C$ because its age is much greater than the 5,730 year half-life of $^{14}C$. Thus, the presence and level of $^{14}C$ in a composition provides a direct measure of the amount of carbon that originated from a source other than a fossil fuel, i.e., the level of biobased carbon in the composition.

Examples, of biobased monomers include, but are not limited to, isobornyl acrylate, isobornyl methacrylate, tetrahydrofurfuryl acrylate, tetrahydrofurfuryl methacrylate, lauryl acrylate, lauryl methacrylate, and mixtures thereof. An example of an isobornyl acrylate includes SR506D (isobornyl acrylate) and an example of isobornyl(meth)acrylate includes SR423D (isobornyl methacrylate) (Sartomer Company; Exton, Pa.). An example of a tetrahydrofurfuryl acrylate includes SR285 (tetrahydrofurfuryl acrylate) and an example of a tetrahydrofurfuryl(meth)acrylate includes SR203 (tetrahydrofurfuryl methacrylate) (Sartomer Company). The Sartomer isobornyl acrylate SR506D contains 76.9% biobased carbon and the Sartomer tetrahydrofurfuryl acrylate SR285 contains 62.5% biobased carbon. Suitable lauryl acrylates and methacrylates can be derived from palm oil and include, for example, AGEFLEX FM246, a lauryl methacrylate commercially available from BASF Corporation.

The copolymer can be derived from 5 or greater weight percent, 10 or greater weight percent, 15 or greater weight percent, 20 or greater weight percent, 25 or greater weight percent, 30 or greater weight percent, 35 or greater weight percent, 40 or greater weight percent, 45 or greater weight percent, 50 or greater weight percent, 55 or greater weight percent, 60 or greater weight percent, 70 or greater weight percent, 75 or greater weight percent, or 80 or greater weight percent of the biobased monomer.

The copolymers described herein can have a biobased carbon content of 10 or greater weight percent. Further, the copolymer can have a biobased carbon content of 12 or greater weight percent, 14 or greater weight percent, 16 or greater weight percent, 18 or greater weight percent, 20 or greater weight percent, 25 or greater weight percent, 30 or greater weight percent, 35 or greater weight percent, 40 or greater weight percent, 45 or greater weight percent, 50 or greater weight percent, 55 or greater weight percent, 60 or greater weight percent, 65 or greater weight percent, 70 or greater weight percent, 75 or greater weight percent, 80 or greater weight percent, 85 or greater weight percent, 90 or greater weight percent, or 95 or greater weight percent of the copolymer composition.

The amount of the biobased monomer can be selected depending upon the desired biobased carbon amount of the copolymer. For example, if a biobased monomer used in the compositions as described herein contains 40% biobased carbon and the biobased monomer is used at a 25 weight percent level in the copolymer, the copolymer will have approximately a 10% biobased carbon level. In this example, if alternative sources of biobased carbon are present, the copolymer could have greater than 10% biobased carbon.

The compositions described herein can include additional monomers. In some embodiments, at least a portion of the additional monomers can also include biobased carbon to increase the overall biobased carbon content of the copolymer.

In some embodiments, the composition includes an acid-based monomer. Acid-based monomers include, but are not limited to, α,β-monoethylenically unsaturated mono- and dicarboxylic acids, e.g., itaconic acid, acrylic acid, methacrylic acid, crotonic acid, dimethacrylic acid, ethylacrylic acid, allylacetic acid, vinylacetic acid, maleic acid, fumaric acid, mesaconic acid, methylenemalonic acid, citraconic acid, and mixtures thereof. In some embodiments, the acid-based monomer includes itaconic acid, acrylic acid, methacrylic acid, and mixtures thereof. The itaconic acid can include biobased carbon. For example, the itaconic acid can be produced by an enzymatic process using carbohydrates (i.e., biobased materials such as corn starch) as a carbon source. Biobased itaconic acid is available, for example, from Sigma-Aldrich Company.

Additional monomers suitable for use in the copolymer include acrylamides and alkyl-substituted acrylamides (e.g., (meth)acrylamide, N-tert-butylacrylamide, and N-methyl (meth)acrylamide); (meth)acrylonitrile; isoprene; anhydrides of α,β-monoethylenically unsaturated mono- and dicarboxylic acids (e.g., maleic anhydride, itaconic anhydride, and methylmalonic anhydride); vinyl and vinylidene halides (e.g., vinyl chloride and vinylidene chloride); vinyl esters of C1-C18 mono- or dicarboxylic acids (e.g., vinyl acetate, vinyl propionate, vinyl n-butyrate, vinyl laurate and vinyl stearate); C1-C4 hydroxyalkyl esters of C3-C6 mono- or dicarboxylic acids, especially of acrylic acid, methacrylic acid or maleic acid, or their derivatives alkoxylated with from 2 to 50 moles of ethylene oxide, propylene oxide, butylene oxide or mixtures thereof, or esters of these acids with C1-C18 alcohols alkoxylated with from 2 to 50 mol of ethylene oxide, propylene oxide, butylene oxide or mixtures thereof (e.g., hydroxyethyl(meth)acrylate, hydroxypropyl (meth)acrylate, and methylpolyglycol acrylate); and monomers containing glycidyl groups (e.g., glycidyl methacrylate).

Further additional monomers suitable for use in the compositions can include linear 1-olefins, branched-chain 1-olefins or cyclic olefins (e.g., ethene, propene, butene, isobutene, pentene, cyclopentene, hexene, and cyclohexene); vinyl and allyl alkyl ethers having 1 to 40 carbon atoms in the alkyl radical, wherein the alkyl radical can possibly carry further substituents such as a hydroxyl group, an amino or dialkylamino group, or one or more alkoxylated groups (e.g., methyl vinyl ether, ethyl vinyl ether, propyl vinyl ether, isobutyl vinyl ether, 2-ethylhexyl vinyl ether, vinyl cyclohexyl ether, vinyl 4-hydroxybutyl ether, decyl vinyl ether, dodecyl vinyl ether, octadecyl vinyl ether, 2-(diethylamino)ethyl vinyl ether, 2-(di-n-butylamino)ethyl vinyl ether, methyldiglycol vinyl ether, and the corresponding allyl ethers); sulfofunctional monomers (e.g., allylsulfonic acid, methallylsulfonic acid, styrenesulfonate, vinylsulfonic acid, allyloxybenzenesulfonic acid, 2-acrylamido-2-methylpropanesulfonic acid, and their corresponding alkali metal or ammonium salts, sulfopropyl acrylate and sulfopropyl methacrylate); vinylphosphonic acid, dimethyl vinylphosphonate, and other phosphorus monomers; alkylaminoalkyl(meth) acrylates or alkylaminoalkyl(meth)acrylamides or quaternization products thereof (e.g., 2-(N,N-dimethylamino)ethyl (meth)acrylate, 3-(N,N-dimethylamino)propyl(meth) acrylate, 2-(N,N,N-trimethylammonium)ethyl(meth) acrylate chloride, 2-dimethylaminoethyl(meth)acrylamide, 3-dimethylaminopropyl(meth)acrylamide, and 3-trimethylammoniumpropyl(meth)acrylamide chloride); allyl esters of C1-C30 monocarboxylic acids; N-Vinyl compounds (e.g., N-vinylformamide, N-vinyl-N-methylformamide, N-vinylpyrrolidone, N-vinylimidazole, 1-vinyl-2-methylimidazole, 1-vinyl-2-methylimidazoline, N-vinylcaprolactam, vinylcarbazole, 2-vinylpyridine, and 4-vinylpyridine); monomers containing 1,3-diketo groups (e.g., acetoacetoxyethyl(meth)acrylate or diacetonacrylamide; monomers containing urea groups (e.g., ureidoethyl(meth)acrylate, acrylamidoglycolic acid, and methacrylamidoglycolate methyl ether); and monomers containing silyl groups (e.g., trimethoxysilylpropyl methacrylate).

Suitable monomers can also include one or more crosslinkers such as N-alkylolamides of α,β-monoethylenically unsaturated carboxylic acids having 3 to 10 carbon atoms and esters thereof with alcohols having 1 to 4 carbon atoms (e.g., N-methylolacrylamide and N-methylolmethacrylamide); glyoxal based crosslinkers; monomers containing two vinyl groups; monomers containing two vinylidene groups; and monomers containing two alkenyl groups. Exemplary crosslinking monomers can include diesters of dihydric alcohols with α,β-monoethylenically unsaturated monocarboxylic acids, of which in turn acrylic acid and methacrylic acid can be employed. Examples of such monomers containing two non-conjugated ethylenically unsaturated double bonds can include alkylene glycol diacrylates and dimethacrylates, such as ethylene glycol diacrylate, 1,3-butylene glycol diacrylate, 1,4-butylene glycol diacrylate and propylene glycol diacrylate, divinylbenzene, vinyl methacrylate, vinyl acrylate, allyl methacrylate, allyl acrylate, diallyl maleate, diallyl fumarate and methylenebisacrylamide. In some embodiments, the crosslinking monomers can include alkylene glycol diacrylates and dimethacrylates, and/or divinylbenzene. The crosslinking monomers when used in the copolymer can be present in an amount of from 0.2 to 5 phm and are considered part of the total amount of monomers used in the copolymer.

In addition to the crosslinking monomers, small amounts (e.g., from 0.01 to 4 phm) of molecular weight regulators, such as tert-dodecyl mercaptan, can be used. Such regulators can be added to the polymerization zone in a mixture with the monomers to be polymerized and are considered part of the total amount of monomers used in the copolymer.

The copolymer can be a styrene acrylic copolymer, a styrene butadiene copolymer, a vinyl acrylic copolymer, or an ethylene vinyl acetate copolymer.

In some embodiments, the copolymer can be a styrene acrylic copolymer derived from monomers including styrene, one or more biobased monomers, one or more alkyl acrylates or methacrylates, and optionally (meth)acrylic acid, itaconic acid, (meth)acrylamide, (meth)acrylonitrile, and hydroxyethyl(meth)acrylate. The one or more alkyl acrylates or methacrylates can include methyl(meth)acrylate, ethyl(meth) acrylate, n-butyl(meth)acrylate, isobutyl(meth)acrylate, tert-butyl(meth)acrylate, 2-ethylhexyl(meth)acrylate, or mixtures thereof. The styrene acrylic copolymer can include from 24 to 77 phm of (meth)acrylates, from 18 to 71 phm of styrene, from 10 to 40 phm of biobased monomer (e.g. isobornyl acrylate), from 0.5 to 5 phm of acid-based monomers, from 0 to 2 phm of (meth)acrylamide, and from 0 to 20 phm of (meth)acrylonitrile. The styrene acrylic copolymer can also include from 0 to 3 phm of one or more crosslinking monomers as described above such as alkylene glycol diacrylates and dimethacrylates.

In some embodiments, the copolymer can be a styrene butadiene copolymer derived from monomers including styrene, butadiene, (meth)acrylamide, (meth)acrylonitrile, itaconic acid and (meth)acrylic acid. The styrene butadiene copolymer can include from 25 to 85 phm of styrene, from 15 to 80 phm of butadiene, from 10 to 40 phm of biobased monomer (e.g. isobornyl acrylate), from 0 to 6 phm of itaconic and/or (meth)acrylic acid, from 0 to 2 phm of (meth) acrylamide, and from 0 to 20 phm of (meth)acrylonitrile. The styrene butadiene copolymer can also include from 0 to 3 phm of one or more crosslinking monomers as described above such as divinylbenzene.

In some embodiments, the copolymer can be a vinyl acrylic copolymer derived from monomers including vinyl acetate, (meth)acrylic acid, (meth)acrylic acid esters, (meth)acrylamide, (meth)acrylonitrile, and mixtures thereof. For example, the vinyl acrylic copolymer can include vinyl acetate and at least one of (meth)acrylic acid, itaconic acid, methyl(meth) acrylate, ethyl(meth)acrylate, n-butyl(meth)acrylate, isobutyl(meth)acrylate, tert-butyl(meth)acrylate, 2-ethylhexyl (meth)acrylate, (meth)acrylamide, (meth)acrylonitrile, and hydroxyethyl(meth)acrylate. The vinyl acrylic copolymer can include from 24 to 77 phm of (meth)acrylates, from 18 to 71 phm of vinyl acetate, from 10 to 40 phm of biobased monomer (e.g. isobornyl acrylate), from 0 to 2 phm of (meth) acrylamide, and from 0 to 20 phm of (meth)acrylonitrile. The vinyl acrylic copolymer can also include from 0 to 3 phm of one or more crosslinking monomers as described above such as alkylene glycol diacrylates and dimethacrylates.

In some embodiments, the copolymer can be an ethylene vinyl acetate copolymer derived from ethylene and vinyl acetate monomers. The ethylene vinyl acetate copolymer can include from 10 to 30 phm of ethylene and from 70 to 90 phm of vinyl acetate. The ethylene vinyl acetate copolymer can also include from 0 to 3 phm of one or more crosslinking monomers.

In some embodiments, the monomers and the amounts that the monomers are used to form the copolymer are selected to provide a glass transition temperature ("Tg") of the copolymer from −10° C. to 25° C.

The copolymer can be prepared by polymerizing the monomers using free-radical aqueous emulsion polymerization. The emulsion polymerization temperature is generally from 30 to 95° C. or from 75 to 90° C. The polymerization medium can include water alone or a mixture of water and water-miscible liquids, such as methanol. Water may be used alone. The emulsion polymerization can be carried out either as a batch, semi-batch or continuous process. Typically, a semi-batch process is used. For example, a portion of the monomers can be heated to the polymerization temperature and partially polymerized, and the remainder of the polymerization batch can be subsequently fed to the polymerization zone continuously, in steps or with superposition of a concentration gradient.

The free-radical emulsion polymerization can be carried out in the presence of a free-radical polymerization initiator. The free-radical polymerization initiators that can be used in the process are all those which are capable of initiating a free-radical aqueous emulsion polymerization including alkali metal peroxydisulfates and $H_2O_2$, or azo compounds. Combined systems can also be used comprising at least one organic reducing agent and at least one peroxide and/or hydroperoxide, e.g., tert-butyl hydroperoxide and the sodium metal salt of hydroxymethanesulfinic acid or hydrogen peroxide and ascorbic acid. Combined systems can also be used additionally containing a small amount of a metal compound which is soluble in the polymerization medium and whose metallic component can exist in more than one oxidation state, e.g., ascorbic acid/iron(II) sulfate/hydrogen peroxide, where ascorbic acid can be replaced by the sodium metal salt of hydroxymethanesulfinic acid, sodium sulfite, sodium hydrogen sulfite or sodium metal bisulfite and hydrogen peroxide can be replaced by tert-butyl hydroperoxide or alkali metal peroxydisulfates and/or ammonium peroxydisulfates. In general, the amount of free-radical initiator systems employed can be from 0.1 to 2 phm, based on the total amount of the monomers to be polymerized. The initiators can be ammonium and/or alkali metal peroxydisulfates (e.g., sodium peroxydisulfates), alone or as a constituent of combined systems. The manner in which the free-radical initiator system is added to the polymerization reactor during the free-radical aqueous emulsion polymerization is not critical. It can either all be introduced into the polymerization reactor at the beginning, or added continuously or stepwise as it is consumed during the free-radical aqueous emulsion polymerization. In detail, this depends in a manner known to an average person skilled in the art both from the chemical nature of the initiator system and on the polymerization temperature. For example, some may be introduced at the beginning and the remainder may be added to the polymerization zone as it is consumed. It is also possible to carry out the free-radical aqueous emulsion polymerization under superatmospheric or reduced pressure.

The copolymer emulsion can include, as a disperse phase, particles of the copolymer dispersed in water. The copolymer emulsion can be prepared with a total solids content of from 10 to 75% by weight, 15 to 65% by weight, or 20 to 60% by weight. The copolymer dispersion can then be concentrated if desired to provide a total solids content of 40-75% by weight. The copolymer particles can have a median particle size of from 80 nm to 200 nm, or from 90 nm to 180 nm. For example, the copolymer particles can have a median particle size of 200 nm or less, 190 nm or less, 180 nm or less, 170 nm or less, 160 nm or less, 150 nm or less, 140 nm or less, 130 nm or less, 120 nm or less, 110 nm or less, 100 nm or less, or 80 nm or greater, 90 nm or greater, 100 nm or greater, 110 nm or greater, 120 nm or greater, 130 nm or greater, 140 nm or greater, 150 nm or greater, or 160 nm or greater. The copolymer emulsion can be converted, in a manner known per se, to redispersible copolymer powders (e.g., spray drying, roll drying or suction-filter drying). If the copolymer dispersion is to be dried, drying aids can be used with the dispersion. The copolymer may have a long shelf life and can be redispersed in water for use in the coating or binding formulation.

The composition can be a coating or binding formulation and can include one or more mineral fillers and/or coating pigments. Mineral fillers generally have a substantial proportion of particles having a particle size greater than 2 microns whereas coating pigments have a substantial proportion of particles having a particle size less than 2 microns. In some embodiments, the mineral fillers and/or coating pigments can be added to impart certain properties to a coating such as smoothness, whiteness, increased density or weight, decreased porosity, increased opacity, flatness, glossiness, and the like. The mineral fillers and/or coating pigments can include calcium carbonate (precipitated or ground), kaolin, clay, talc, diatomaceous earth, mica, barium sulfate, magnesium carbonate, vermiculite, graphite, carbon black, alumina, silicas (fumed or precipitated in powders or dispersions), colloidal silica, silica gel, titanium oxides, aluminum hydroxide, aluminum trihydrate, satine white, and magnesium oxide. The formulation can include exclusively mineral fillers or coating pigments but generally includes a blend of mineral fillers and coating pigments (e.g. weight ratios of 90:10, 80:20, 70:30, 60:40, 50:50, 40:60, 30:70, 20:80 or 10:90). Exemplary coating pigments include MIRAGLOSS 91 (a kaolin clay coating pigment commercially available from BASF Corporation) and HYDROCARB 90 (a calcium carbonate coating pigment commercially available from Omya Paper). An exemplary mineral filler is a calcium carbonate mineral filler such as DF 50 from Franklin Industrial Minerals.

In some embodiments, the formulation can include non-toxic anticorrosive pigments. Examples of such anticorrosive pigments include phosphate-type anticorrosive pigments such as zinc phosphate, calcium phosphate, aluminum phosphate, titanium phosphate, silicon phosphate, and ortho- and fused-phosphates thereof.

In some embodiments, the formulation can include one or more dyes and/or colored pigments to produce a colored or patterned paper or to change the shade of the coating. Exemplary dyes can include basic dyes, acid dyes, anionic direct dyes, and cationic direct dyes. Exemplary colored pigments include organic pigments and inorganic pigments in the form of anionic pigment dispersions and cationic pigment dispersions.

In some embodiments, one or more thickeners (rheology modifiers) can be added to increase the viscosity of the coating or binding formulation. Suitable thickeners include acrylic copolymer dispersions sold under the STEROCOLL and LATEKOLL trademarks from BASF Corporation, Florham Park, N.J., hydroxyethyl cellulose, guar gum, jaguar, carrageenan, xanthan, acetan, konjac mannan, xyloglucan, urethanes and mixtures thereof. The thickeners can be added to the paper coating or binding formulation as an aqueous dispersion or emulsion, or as a solid powder. Exemplary dispersants can include sodium polyacrylates in aqueous solution such as those sold under the DARVAN trademark by R.T. Vanderbilt Co., Norwalk, Conn.

The coating or binding formulation described herein can include additives such as dispersants, initiators, stabilizers, chain transfer agents, buffering agents, salts, preservatives, fire retardants, wetting agents, protective colloids, biocides, corrosion inhibitors, crosslinkers, crosslinking promoters, and lubricants.

The binding or coating composition described herein can include greater than 50 wt % solids, 55 to 75 wt % solids, or 60 to 70 wt % solids. The one or more mineral fillers and/or coating pigments can be present in an amount greater than 65 wt %, 70 wt %, 80 wt %, or 90 wt % of the coating or binding formulation. For example, the one or more mineral fillers and/or coating pigments can be present in an amount of 70 to 98 wt %, 80 to 95 wt %, or 85 to 90 wt % of the total volume of the formulation. The copolymer can be present in an amount of 2 to 12 wt %, 4 to 10 wt %, or 6 to 9 wt % of the solid content. A thickener can be present in an amount of 0 to 5 wt %, greater than 0 to 3 wt %, or greater than 0 to 1 wt % of the solid content. Anticorrosive pigments, dyes and colored pigments can be present in an amount of 0 to 3 wt %, 0 to 2 wt %, or 0 to 1 wt % of the solid content. Other additives can be present in an amount of 0 to 5 wt %, 0 to 3 wt %, or 0 to 1 wt % of the solid content.

The resulting compositions as described herein can be used in many applications and particularly as binding or coating compositions. For example, the compositions as described herein can be used as paper coatings, carpet backing, paints, surface coatings, and binders. When used as carpet backing the compositions as described herein can meet the low VOC limit requirements of the carpet industry (e.g., less than 75 ppm total of unreacted monomers such as styrene, ethylbenzene, 4-VCH (4-vinylcyclohexene), and 4-PCH (4-phenylcyclohexene); of this 75 ppm less than 50 ppm of either 4-VCH or 4-PCH, less than 40 ppm styrene, and less than 5 ppm ethylbenzene). Additionally, when used as paint, the compositions as described herein can meet the low VOC limit requirements of the paint industry set forth in EPA Method 24 (e.g., less than 50 g/l VOC's or even less than 10 g/l VOC's). Further, when used as carpet backing the compositions as described herein provide good resistance to wet delamination. When used as components of interior finishing products, e.g., carpet backing, the biobased content of the compositions as described herein provides valuable points toward certification in the LEED Green Building Rating System™.

The compositions will now be described by the following non-limiting examples. In the examples, the term "parts" refers to "dry parts" unless otherwise indicated.

EXAMPLES

Example Composition 1

Example Composition 1 was made according to the following procedure. In a continuous feed process, a reactor was initially charged with water (57.2 parts), itaconic acid (0.9 parts), and DISOLVENE E-39 (Akzo Nobel N.V.; Arnhem, Netherlands) (0.03 parts) (DISOLVENE® E-39 contains a tetra sodium salt of ethylenediaminetetraacetic acid ("EDTA") in a 39% aqueous solution). Additional water (13.3 parts) and sodium persulfate (0.7 parts), were then added to the reactor as an initiator feed over a four and a half hour time period. After beginning the addition of the initiator feed to the reactor, an aqueous feed comprised of water (17.3 parts), itaconic acid (1.1 parts), CALFAX® DB-45 (diphenyl oxide disulfonate anionic surfactants) (0.6 parts), and tetrasodium pyrophosphate (0.2 parts) were added to the reactor over a four hour time period. Simultaneously, separate monomer feeds were added to the reactor to form the copolymer. The first monomer feed was butadiene (34 parts). The second monomer feed contained styrene (54 parts), SULFOLE 120 (Chevron Phillips Chemical Company; The Woodlands, Tex.) (SULFOLE 120 contains tert-dodecyl mercaptan) (1.23 parts), and isobornyl acrylate (10 parts; SARTOMER SR-506A). After the initiator, aqueous, and monomer feed were charged to the reactor, i.e. after 4.5 hours, the contents were partially neutralized to pH 5-6 and stripped by the addition of 60 mL 10% NaOH, 70 ml 5% TBHP, 70 ml 5% SMBS and 800 mL water, then, once stripped, an additional 60 mL 10% NaOH was added. Finally, at less than 40° C., 12 g of 1.4% ACTICIDE MV (Thor Group Limited; Kent, England) (ACTICIDE MV is a biocide containing a concentrated formulation of CIT/MIT) was added. The seed size for the polymerization was 31.0 nm.

Example Composition 1 provides a copolymer derived from 34 wt % butadiene, about 54 wt % styrene, 2 wt % itaconic acid, and about 10 wt % isobornyl acrylate. This composition has a solids content of about 53-54%, a viscosity of about 232 cps, a volume average particle size of about 139 nm, and a number average particle size of about 125 nm. Not including the biobased carbon addition from itaconic acid, Example Composition 1 provided about 7.8% biobased carbon content from isobornyl acrylate.

Comparative Composition 1 and Example Compositions 2-13

Comparative Composition 1 and Example Compositions 2-13 were made using the same procedure described above for Example Composition 1 with the monomer levels indicated in Table 1 and the following exceptions.

For Comparative Composition 1, isobornyl acrylate was not used and the monomer composition was 34% butadiene, 2% itaconic acid, and 64% styrene. For Example Compositions 2-13, the seed charge was 0.74 parts, CALFAX DB-45 was used at 0.6 parts, and SULFONE 120 (tert-dodecyl mercaptan) was used at the value shown in Table 1. Properties for Example Compositions 2-13 are also provided in Table 1.

Comparative Composition 2 and Example Compositions 14-25

100 parts by weight of Comparative Composition 1 and Example Compositions 2-13 were compounded with 200 parts by weight calcium carbonate filler (GFP 101; Oglebay Norton Filler Products; Cleveland, Ohio) and 0.2 parts by weight sodium polyacrylate thickener (PG T-111 from Para-Chem; Simpsonville, S.C.) to form Comparative Composition 2 and Example Compositions 14-25, respectively. The 200 parts filler is used to provide a composition useful as a backing or adhesive layer for carpet. The properties of these compositions are shown in Table 2. The total solids content of each composition was between 75 and 85%.

As shown in Table 2, Example Compositions 14-25 have similar physical properties to Comparative Composition 2.

Comparative Composition 3 and Example Compositions 26-38

Films incorporating Comparative Composition 1 and Example Compositions 2-13 were also compounded without the 200 parts calcium carbonate filler to produce Comparative Composition 3 and Example Compositions 26-38, respectively. The tensile strength and % elongation for these compositions were measured. The data are shown in Table 3.

As shown in Table 3, Example Compositions 26-38 have similar physical properties to Comparative Composition 3.

Comparative Composition 4 and Example Compositions 39-50

100 parts by weight of Comparative Composition 1 and Example Compositions 2-13 were compounded with 600 parts by weight calcium carbonate filler (GFP 101; Oglebay Norton Filler Products; Cleveland, Ohio), 0.5 parts by weight sodium polyacrylate thickener (PG T-111 from Para-Chem; Simpsonville, S.C.), and 1.75 parts by weight surfactant (STANFAX 565 from Para-Chem; Simpsonville, S.C.) to form Comparative Composition 4 and Example Compositions 39-50, respectively. The 600 parts filler is used to provide a composition useful as pre-coat layer for carpet. The compositions were frothed to limit penetration and properties of these compositions are shown in Tables 4 and 5. The total solids content of each composition was 85%.

As shown in Tables 4 and 5, Example Compositions 39-50 have similar physical properties to Comparative Composition 4.

Example Composition 51

Example Composition 51 was made according to the following procedure. In a continuous feed process, a reactor was initially charged with water (53 parts), itaconic acid (0.5 parts), seed polymer (0.7 parts), and DISOLVENE E-39 (Akzo Nobel N.V.; Arnhem, Netherlands) (0.03 parts) (DISOLVENE® E-39 contains a tetra sodium salt of ethylenediaminetetraacetic acid ("EDTA") in a 39% aqueous solution). Additional water (19 parts) and sodium persulfate (1.0 parts) were then added to the reactor as an initiator feed over a four and a half hour time period. After beginning the addition of the initiator feed to the reactor, an aqueous feed comprised of water (15 parts), itaconic acid (1.5 parts), CALFAX® DB-45 (diphenyl oxide disulfonate anionic surfactants) (0.7 parts), and tetrasodium pyrophosphate (0.2 parts) were added to the reactor over a four hour time period. Simultaneously, separate monomer feeds were added to the reactor to form the copolymer. The first monomer feed was butadiene (15 parts). The second monomer feed contained styrene (53 parts), SULFOLE 120 (Chevron Phillips Chemical Company; The Woodlands, Tex.) (SULFOLE 120 contains tert-dodecyl mercaptan) (0.2 parts), and lauryl methacrylate (30 parts; BASF Ageflex FM246). After the initiator, aqueous, and monomer feeds were charged to the reactor, i.e. after 4.5 hours, the contents were partially neutralized to pH 5-6 and stripped by the addition of 60 mL 10% NaOH, 70 ml 5% TBHP, 70 ml 5% SMBS and 800 mL water, then, once stripped, an additional 60 mL 10% NaOH was added. Finally, at less than 40° C., 12 g of 1.4% ACTICIDE MV (Thor Group Limited; Kent, England) (ACTICIDE MV is a biocide containing a concentrated formulation of CIT/MIT) was added. The seed size for the polymerization was 29.0 nm.

Example Composition 51 provides a copolymer derived from 15 wt % butadiene, about 53 wt % styrene, 2 wt % itaconic acid, and about 30 wt % lauryl methacrylate. This composition has a solids content of about 53%, a pH level of 7.5, a viscosity of about 420 cps, a volume average particle size of about 165 nm, and a number average particle size of about 148 nm. The Tg of the copolymer was 15° C. Not including the biobased carbon addition from itaconic acid, Example Composition 51 provided about 23% biobased carbon content from lauryl methacrylate.

Example Compositions 52 and 53

Films incorporating Example Composition 51 were compounded with 600 parts of calcium carbonate filler, as described for Example Compositions 39-50, to form Example Composition 52. The resulting films had a thickener demand of 5.6, a viscosity after filler of 15600 cP at 80% solids, and a froth viscosity of 32,750 cP. The tensile strength of the films was 1037 psi with a % elongation at break of 3.2%.

Films incorporating Example Composition 51 were compounded with 200 parts of calcium carbonate filler, as described for Examples 14-25, to form Example Composition 53. The resulting films had a thickener demand of 7.5, and a viscosity of 10,200 cP at 55% solids. The dry strength of the films was 7.6 lbs and the wet strength was 2.2 lbs (29% retention), as measured according to the wet delamination test protocol.

The compositions and methods described herein are not limited in scope by the embodiments disclosed herein which are intended as illustrations of a few aspects of the compositions and methods and any embodiments which are functionally equivalent are within the scope of the claims. Various modifications of the compositions and methods in addition to those shown and described herein will become apparent to those skilled in the art and are intended to fall within the scope of the appended claims. Further, while only certain representative combinations of monomers used to make a composition or method steps disclosed herein are specifically discussed in the embodiments above, other combinations of monomers used to make a composition or method steps will become apparent to those skilled in the art and also are intended to fall within the scope of the appended claims. Thus a combination of monomers used to make a composition or steps may be explicitly mentioned herein; however, other combinations of monomers used to make a composition or steps are included, even though not explicitly stated. The term "comprising" and variations thereof as used herein are open, non-limiting terms. The term "including" and variations thereof as used herein mean "comprising" and variations thereof.

TABLE 1

Example Compositions 2 to 13

| | Monomers | | | | Properties | | | |
|---|---|---|---|---|---|---|---|---|
| Example Composition | Butadiene | Sulfone 120 | Isobornyl acrylate | Styrene | $T_g{}^a$ (° C.) | Solids[b] (%) | pH | Viscosity[c] (cPs) |
| 2 | 33 | 1 | 33 | 33 | 15 | 52.8 | 7.5 | 227 |
| 3 | 33 | 1 | 33 | 33 | 12 | 54.2 | 7.6 | 212 |
| 4 | 35 | 1 | 33 | 33 | 15 | 54.1 | 7.5 | 168 |
| 5 | 35 | 1.5 | 33 | 30.7 | 6 | 52.8 | 7.5 | 199 |

TABLE 1-continued

Example Compositions 2 to 13

| Example Composition | Monomers | | | | Properties | | | |
|---|---|---|---|---|---|---|---|---|
| | Butadiene | Sulfone 120 | Isobornyl acrylate | Styrene | $T_g{}^a$ (° C.) | Solids$^b$ (%) | pH | Viscosity$^c$ (cPs) |
| 6 | 35 | 1.5 | 33 | 30.7 | 3 | 53.9 | 7.7 | 292 |
| 7 | 35 | 1 | 33 | 31 | 8 | 53.7 | 7.6 | 246 |
| 8 | 33 | 1.3 | 33 | 32.7 | 7 | 53.9 | 7.5 | 241 |
| 9 | 33 | 1.3 | 33 | 32.7 | 10 | 53.4 | 7.6 | 170 |
| 10 | 35 | 1.3 | 33 | 30.7 | 3 | 53.2 | 7.4 | 178 |
| 11 | 33 | 1.5 | 33 | 32.5 | 15 | 53.2 | 7.6 | 208 |
| 12 | 35 | 1.3 | 33 | 30.7 | 8 | 53.4 | 7.7 | 153 |
| 13 | 33 | 1.5 | 33 | 32.5 | 8 | 54.2 | 7.6 | 158 |

$^a$As measured using differential scanning calorimetry (DSC) at the mid-point of the DSC curve.
$^b$Weight measured after drying in microwave oven to remove water and other volatiles.
$^c$Brookfield viscosity.

TABLE 2

Comparative Example 2 and Example Compositions 14 to 25

| Example Composition | Thickener Demand$^a$ | Dry Delamination$^b$ | Wet Delamination$^c$ | % Retention$^d$ | Tensile Strength$^e$ | % Elongation$^f$ |
|---|---|---|---|---|---|---|
| Comp 2 | 3.2 | 8.2 | 3.1 | 37.8 | 1516 | 31 |
| 14 | 5 | 7.9 | 2.4 | 30.4 | 1671 | 19 |
| 15 | 5 | 7.8 | 2.5 | 32.1 | 1767 | 19 |
| 16 | 5.5 | 7.9 | 2.5 | 31.7 | 1467 | 29.4 |
| 17 | 5.5 | 7.2 | 3.4 | 47.2 | 1061 | 37.4 |
| 18 | 3.9 | 6.6 | 3 | 45.5 | 879 | 50 |
| 19 | 5.5 | 7.1 | 2.5 | 35.2 | 1301 | 30.2 |
| 20 | 4.8 | 7.1 | 2.7 | 38 | 1100 | 35.6 |
| 21 | 5.5 | 7.7 | 3 | 39 | 1414 | 22.5 |
| 22 | 5.9 | 7.2 | 2.3 | 31.9 | 1120 | 45 |
| 23 | 5.5 | 6.7 | 2.9 | 43.3 | 1234 | 27.4 |
| 24 | 5.9 | 6.3 | 2.5 | 39.7 | 1140 | 33.8 |
| 25 | 5 | 6.5 | 2.8 | 43.1 | 1076 | 37.9 |

$^a$Grams of wet thickener added to produce a target viscosity of approximately 600 cPs
$^b$Tensile strength (pounds) measured using Instron (90° peel).
$^c$Tensile strength (pounds) after 24 hour soak in water measured using Instron(90° peel).
$^d$Wet delamination/dry delamination
$^e$Pounds per square inch; Instron.
$^f$Measured using Instron.

TABLE 3

Comparative Example 3 and Example Compositions 26 to 38

| Example Composition | Tensile Strength$^a$ | % Elongation$^b$ |
|---|---|---|
| Comp 3 | 2215 | 459 |
| 26 | 2224 | 331 |
| 27 | 2294 | 312 |
| 28 | 2280 | 434 |
| 29 | 1350 | 565 |
| 30 | 1347 | 643 |
| 31 | 2183 | 490 |
| 32 | 1694 | 562 |
| 33 | 1658 | 419 |
| 34 | 1656 | 591 |
| 36 | 1463 | 437 |
| 37 | 1862 | 512 |
| 38 | 1648 | 554 |

$^a$Pounds per square inch; measured using Instron.
$^b$Measured using Instron.

TABLE 4

Comparative Example 4 and Example Compositions 39 to 50

| Example Composition | Thickener Demand$^a$ | Pre-thickener Viscosity$^b$ | Initial Viscosity$^b$ | 1 Day Viscosity$^b$ | 5 Day Viscosity$^b$ | Beat Back$^c$ | Froth Rate$^d$ | Froth Viscosity$^e$ |
|---|---|---|---|---|---|---|---|---|
| Comp 4 | 2.8 | 3100 | 16200 | 19500 | 18250 | 17200 | 62.2 | 30000 |
| 39 | 2.8 | 3200 | 15200 | 17500 | 16000 | 14800 | 60.6 | 20500 |
| 40 | 3.1 | 3400 | 15000 | 17000 | 15500 | 13800 | 63.5 | 21500 |
| 41 | 3.1 | 3600 | 15200 | 17000 | 15750 | 13800 | 61.2 | 20500 |
| 42 | 2.8 | 3500 | 15800 | 18000 | 16250 | 14700 | 66.4 | 26500 |

TABLE 4-continued

Comparative Example 4 and Example Compositions 39 to 50

| Example Composition | Thickener Demand$^a$ | Pre-thickener Viscosity$^b$ | Initial Viscosity$^b$ | 1 Day Viscosity$^b$ | 5 Day Viscosity$^b$ | Beat Back$^c$ | Froth Rate$^d$ | Froth Viscosity$^e$ |
|---|---|---|---|---|---|---|---|---|
| 43 | 1.9 | 4500 | 15000 | 16000 | 14000 | 13200 | 66.3 | 23000 |
| 44 | 2.5 | 3900 | 15200 | 17000 | 15250 | 14200 | 61.7 | 23000 |
| 45 | 2.5 | 3900 | 15800 | 17500 | 16500 | 14700 | 65.7 | 26000 |
| 46 | 2.8 | 3100 | 15200 | 17000 | 16500 | 14200 | 61.9 | 25500 |
| 47 | 2.2 | 4100 | 15000 | 17500 | 15250 | 14600 | 63.2 | 23000 |
| 48 | 2.8 | 3800 | 15400 | 17500 | 16750 | 14900 | 61.9 | 22500 |
| 49 | 2.8 | 3500 | 15400 | 18000 | 16250 | 14700 | 62.4 | 20750 |
| 50 | 2.8 | 3400 | 15600 | 17500 | 16700 | 14800 | 64.2 | 26500 |

$^a$Grams of wet thickener added to produce a target viscosity of approximately 1600 cPs.
$^b$Brookfield viscosity (cPs).
$^c$Brookfield viscosity (cPs) of compound after shearing/agitation is applied to the 5-day old composition.
$^d$Grams per three fluid ounces (300 g of compound at the time of preparation mixed at 188 +/− 2 rpm for three minutes then poured into three ounce cup and weighed).
$^e$Brookfield viscosity (cPs) of compound mixed at 188 +/− 2 rpm's until a 1 oz cup weighs 26.4 +/− .2 grams.

TABLE 5

Comparative Example 4 and Example Compositions 39 to 50

| Example Composition | Tensile Strength$^a$ | % Elongation$^b$ |
|---|---|---|
| Comp 4 | 1164 | 5.8 |
| 39 | 1154 | 2.6 |
| 40 | 1130 | 2.5 |
| 41 | 1118 | 4.6 |
| 42 | 878 | 9.2 |
| 43 | 746 | 12.2 |
| 44 | 915 | 6.2 |
| 45 | 914 | 10.1 |
| 46 | 994 | 5.6 |
| 47 | 671 | 10.6 |
| 48 | 875 | 4.3 |
| 49 | 772 | 6.2 |
| 50 | 784 | 8.2 |

$^a$Pounds per square inch; measured using Instron.
$^b$Measured using Instron.

What is claimed is:

1. A binder or coating composition comprising:

(A) a copolymer derived from monomers comprising:

a vinyl aromatic monomer;

a second monomer selected from the group consisting of butadiene, alkyl acrylates, alkyl methacrylates, and mixtures thereof; and a biobased monomer, wherein the copolymer has a biobased carbon content of 10 to 95 weight percent, based on the weight of the copolymer, and the median particle size of the copolymer is 80 nm to 200 nm; and (B) a coating pigment, mineral filler, or mixture thereof, wherein the coating pigment, mineral filler, or mixture thereof is present in an amount of 60 to 90 weight percent, based on the weight of the binder or coating composition.

2. The binder or coating composition according to claim 1, wherein the biobased monomer includes isobornyl acrylate, isobornyl methacrylate, tetrahydrofurfuryl acrylate, tetrahydrofurfuryl methacrylate, lauryl acrylate, lauryl methacrylate, or mixtures thereof.

3. The binder or coating composition of claim 1, wherein the vinyl aromatic monomer is present in an amount of 20 to 80 weight percent based on the total (meth)acrylate content.

4. A binder or coating composition comprising;

(A) a copolymer derived from monomers comprising:

a vinyl aromatic monomer;

a second monomer selected from the group consisting of butadiene, alkyl acrylates, alkyl methacrylates, and mixtures thereof; and a biobased monomer, wherein the vinyl aromatic monomer is present in an amount of 20 to 80 weight percent based on the total (meth)acrylate content; and (B) a coating pigment, mineral filler, or mixture thereof, wherein the coating pigment, mineral filler, or mixture thereof is present in an amount of 65 to 90 weight percent, based on the weight of the binder or coating composition.

5. A process for preparing a binder or coating composition, comprising:

preparing a composition comprising copolymer by copolymerizing a vinyl aromatic monomer; a second monomer selected from the group consisting of butadiene, alkyl acrylates, alkyl methacrylates, and mixtures thereof; and a biobased monomer, wherein the median particle size of the copolymer is 80 to 200 nm, and mixing the composition with a coating pigment, mineral filler, or mixture thereof, wherein the coating pigment, mineral filler, or mixture thereof is present in an amount of 65 to 90 weight percent, based on the weight of the binder or coating composition.

6. The process of claim 5, wherein the biobased monomer includes isobornyl acrylate, isobornyl methacrylate, tetrahydrofurfuryl acrylate, tetrahydrofurfuryl methacrylate, lauryl acrylate, lauryl methacrylate, or mixtures thereof.

7. The binder or coating composition of claim 1, wherein the vinyl aromatic monomer comprises styrene.

8. The binder or coating composition of claim 1, wherein the biobased monomer includes 50 to 80 weight percent biobased carbon content, based on the total carbon content of the biobased monomer.

9. The binder or coating composition of claim 1, wherein the biobased monomer comprises 20 to 80 weight percent of the copolymer.

10. The binder or coating composition of claim 1, wherein the second monomer comprises butadiene.

11. The binder or coating composition of claim 1, wherein the second monomer comprises an alkyl acrylate, an alkyl methacrylate, or mixtures thereof.

12. The binder or coating composition of claim 11, wherein the second monomer comprises butyl acrylate.

13. The binder or coating composition of claim 1, further comprising an acid-based monomer.

14. The binder or coating composition of claim 13, wherein the acid-based monomer comprises itaconic acid, acrylic acid, methacrylic acid, or mixtures thereof.

15. Carpet backing comprising the binding or coating composition of claim 1.

* * * * *